United States Patent
Sato et al.

Patent Number: 6,081,237
Date of Patent: Jun. 27, 2000

[54] ANTENNA/MIRROR COMBINATION APPARATUS

[75] Inventors: Shinichi Sato; Shinichi Honma, both of Tokyo, Japan

[73] Assignee: Mitsubishi Denki Kabushiki Kaisha, Tokyo, Japan

[21] Appl. No.: 09/148,946

[22] Filed: Sep. 8, 1998

[30] Foreign Application Priority Data

Mar. 5, 1998 [JP] Japan ................................. 10-053710

[51] Int. Cl.⁷ .................................................. H01Q 1/32
[52] U.S. Cl. .................................. 343/713; 343/700 MS; 343/767; 343/711
[58] Field of Search .................................. 343/711, 712, 343/713, 767, 771, 700 MS; H01Q 1/32

[56] References Cited

U.S. PATENT DOCUMENTS 5,649,316 7/1997 Prudhomme et al. .................. 455/345
5,798,688 8/1998 Schofield ................................. 340/438

FOREIGN PATENT DOCUMENTS 54-45040 4/1979 Japan .
3-52015 11/1991 Japan .

*Primary Examiner*—Don Wong
*Assistant Examiner*—Shih-Chao Chen
*Attorney, Agent, or Firm*—Sughrue, Mion, Zinn, Macpeak & Seas, PLLC

[57] ABSTRACT

An antenna/mirror combination apparatus in which the space occupied by a low-profile antenna is reduced with internal space of a mirror case being effectively utilized for the other purposes and which can be realized inexpensively in a small size without impairing the degree of freedom in design owing to an integral combination of the antenna array with a mirror. The apparatus includes a mirror (3) having an electrically conductive reflecting mirror surface (10) and a low-profile antenna (8) having an electrically conductive antenna element, wherein the low-profile antenna (8) is disposed and combined integrally with the mirror (3) such that at least a part of the antenna element functions as a part of the reflecting mirror surface (10).

17 Claims, 12 Drawing Sheets

ANTENNA/MIRROR COMBINATION APPARATUS

BACKGROUND OF THE INVENTION

1. Field of the Invention

The present invention generally relates to an antenna apparatus used in a radar system mounted on a motor vehicle or the like. More particularly, the invention is concerned with an antenna apparatus or more properly antenna/mirror combination apparatus in which an antenna array is integrally combined with a mirror such as a door mirror mounted on a motor vehicle or the like in such a manner in which at least a part of an antenna element of the antenna array serves also as a part of a reflecting surface of the mirror. Thus, the invention is directed to an inexpensive implementation of the antenna apparatus in a small size while affording a sufficient degree of freedom in design.

2. Description of Related Art

For having better understanding of the invention, background techniques thereof will first be described in some detail. FIG. 21 shows in a sectional side elevational view an antenna apparatus for a car radar system described, for instance, in Japanese Unexamined Patent Application Publication No. 45040/1979 (JP-A-54-45040). In this antenna apparatus, an antenna for the radar system is implemented by making use of a fender mirror of a motor vehicle (i.e., in integral combination with the mirror, to say in another way). Accordingly, the antenna apparatus now under consideration may also be referred to as an antenna/mirror combination apparatus.

Referring to FIG. 21, the antenna/mirror combination apparatus denoted generally by reference character 1A is composed of a mirror case 2 made of a resin material, a mirror 3 having a reflecting mirror surface (not shown) disposed at a predetermined position within the mirror case 2, a feed horn 4 for sending out or radiating transmitting a radio wave to receive echoes, a reflector 5 constituted by a light-transmissive electric conductor for reflecting the radio wave and a transceiver unit 6 for transmitting/receiving radio waves through the medium of the feed horn 4.

The mirror case 2 and the feed horn 4 are mounted on a motor vehicle body 7. The feed horn 4 is disposed in opposition to the reflector 5 and mounted in front of the mirror 3 for radiating the radio wave toward the reflector 5 from a position located outside of the visual field of the mirror 3.

Now, description will turn to operation of the hitherto known or conventional antenna/mirror combination apparatus of the structure described above. The radio wave radiated from the feed horn 4 is reflected at the reflector 5 to be sent out as a radio wave beam of high directivity in the visual field direction of the mirror 3. On the other hand, reflected beam or echo from an object is reflected at the reflector 5 to be received by the transceiver unit 6 by way of the feed horn 4.

On the other hand, the reflector 5 is formed of a material transmissive or transparent to visible light so that the visible light rays impinging onto the reflector 5 are reflected at the mirror 3 to be observed by a driver of the motor vehicle. In this manner, the reflector 5 housed within the mirror case 2 can reflect only the radio waves to play a role only in the transmission/reception of the radio waves without impairing the inherent function of the mirror 3.

FIG. 22 is a perspective view showing in a developed state a hitherto known antenna/mirror combination apparatus disclosed, for example, in Japanese Utility Model Publication 52015/1991. In the case of the antenna/mirror combination apparatus shown in FIG. 22, a thin-structure antenna is housed within a mirror case of a fender mirror or a door mirror of a motor vehicle.

Referring to FIG. 22, the antenna/mirror combination apparatus generally denoted by reference character 1B is comprised of a mirror case 2 and a mirror 3 such as those mentioned previously and a low-profile (thin-plate like) antenna 8 disposed between the mirror case 2 and the mirror 3.

The low-profile antenna 8 is constituted, for example, by a microstrip antenna formed on a substrate and mounted internally of the mirror case 2. In the case of the antenna/mirror combination apparatus shown in FIG. 22, the low-profile antenna 8 is incapable of transmitting/receiving radio waves in the direction in which the mirror 3 is oriented. It is capable of transmitting/receiving the radio waves only in the direction opposite to that covered by the mirror 3.

At this juncture, it should be mentioned that the mirror 3 for the motor vehicle is generally implemented rotatably in order to allow the driver to select the field of view. To this end, an appropriate mirror driving mechanism (not shown) has to be installed within the mirror case 2. Consequently, the mirror case 2 will necessarily have to be implemented in a relatively large structure. Besides, restriction is imposed on the design of the mirror case 2 because of necessity of assuring a space for accommodating the low-profile antenna 8 therein.

As is apparent from the foregoing, in the antenna/mirror combination apparatuses known heretofore, the antenna array is disposed in the vicinity of the mirror 3 or within the mirror case 2 without modifying the structure of the mirror 3 itself. Consequently, the antenna/mirror combination apparatus is necessarily realized in a large size because of bulky peripheral structure, presenting thus a problem that not only the miniaturization of the antenna/mirror combination apparatus but also low-cost manufacturing thereof is difficult or practically impossible.

In particular, when the feed horn 4 is disposed in the vicinity of the mirror 3, as in the case of the antenna/mirror combination apparatus shown in FIG. 21, there arises the necessity of installing the reflector 5 in addition to the mirror 3. Thus, the problem mentioned above becomes more serious.

On the other hand, in the case of the antenna/mirror combination apparatus shown in FIG. 22 in which the low-profile antenna 8 is disposed within the mirror case 2, the space required for installation of the mirror driving unit within the mirror case 2 is subjected to limitation due to disposition of the low-profile antenna 8, giving rise to another problem that the degree of freedom in design of the mirror 3 is remarkably degraded.

Furthermore, because the mirror 3 provides an obstacle to the low-profile antenna 8, transmission/reception of the radio waves is rendered impossible in the direction in which the mirror 3 is oriented, incurring a further problem.

SUMMARY OF THE INVENTION

In the light of the state of the art described above, it is an object of the present invention to provide an antenna/mirror combination apparatus which can be implemented inexpensively in a small size while affording a sufficient degree of freedom in design.

According to the basic concept of the invention, it is proposed that at least a part of antenna element or elements is so implemented as to serve as a part or parts of a reflecting mirror surface to thereby allow the antenna array to be combined with a mirror in an integral structure.

In view of the above and other objects which will become apparent as the description proceeds, there is provided according to a general aspect of the present invention an antenna/mirror combination apparatus which includes a mirror having an electrically conductive reflecting mirror surface, and a low-profile antenna having an electrically conductive antenna element including a radiating portion. The low-profile antenna is combined integrally with the mirror such that at least a part of the antenna element functions as a part of the reflecting mirror surface.

By virtue of the arrangement described above, the space or room occupied by the low-profile antenna can be reduced, whereby the internal space of a mirror case can be effectively utilized for the other purposes. Thus, there can be realized inexpensively the antenna/mirror combination apparatus in a small size without impairing the degree of freedom in design owing to the antenna structure combined integrally with the mirror.

In a preferred mode for realizing the above-mentioned general aspect of the present invention, the antenna element which serves also as a part of the reflecting mirror surface of the mirror may be so designed as to include a radiating portion of the low-profile antenna.

With the arrangement mentioned above, there can be realized the antenna array which can easily be incorporated integrally in the mirror.

In another preferred mode for carrying out the invention, the radiating portion may be formed on a rear surface of a front glass plate of the mirror through a printing process, and the low-profile antenna may be disposed in superposition on the rear surface of the front glass plate to be integrally combined with the radiating portion.

By virtue of the above-mentioned arrangement, there can be realized the antenna structure which can easily be incorporated integrally in the mirror.

In yet another preferred mode for carrying out the invention, the low-profile antenna may be implemented in the form of a slot antenna array which includes a slot array serving as the radiating portion, and a waveguide including the slot array.

By virtue of the arrangement mentioned above, there can be realized the antenna array which can easily be combined integrally with the mirror.

In still another preferred mode for carrying out the invention, the slot array may be formed in a radiating surface of a waveguide of the slot antenna array, and the front glass plate of the mirror may be disposed in superposition on the radiating surface of the waveguide.

Owing to the arrangement mentioned above, there can be realized the antenna array which can easily be built integrally in the mirror.

In a further preferred mode for carrying out the invention, the low-profile antenna may be implemented in the form of a microstrip antenna array which includes a radiating element constituting the radiating portion, a ground conductor layer disposed in opposition to the radiating portion, and a dielectric layer interposed between the radiating portion and the ground conductor layer.

With the arrangement mentioned above, the antenna array can easily be incorporated integrally in the mirror.

In a yet further preferred mode for carrying out the invention, the radiating element may be formed on a top surface of the dielectric layer.

By virtue of the feature mentioned above, the antenna array can easily be incorporated integrally in the mirror.

In a still further preferred mode for carrying out the invention, the microstrip antenna array may be formed only in a lateral region of the mirror and the radiating portion may be constituted by a radiating element array including a plurality of radiating elements.

With the arrangement mentioned above, there can be realized the antenna array which can easily be incorporated integrally in the mirror without impairing the inherent function of the mirror.

In another preferred mode for carrying out the invention, the dielectric layer and the ground conductor layer may be disposed only at a rear side of the radiating portion.

With the arrangement mentioned above, there can be realized the antenna array which can be incorporated integrally in the mirror without involving high manufacturing cost and balkiness.

In yet another preferred mode for carrying out the invention, the dielectric layer and the ground conductor layer may be disposed substantially over a whole rear surface of the mirror.

Owing to the arrangement mentioned above, the antenna array can easily be incorporated integrally in the mirror while suppressing appearance of an offset portion in the rear surface of the mirror.

In still another preferred mode for carrying out the invention, the low-profile antenna may be implemented in the form of a microstrip antenna which includes radiating elements constituting the radiating portion, a ground conductor layer disposed in opposition to the radiating portion, and a dielectric layer interposed between the radiating portion and the ground conductor layer, wherein the antenna element functioning as a part of the reflecting mirror surface of the mirror includes the ground conductor layer.

By virtue of the arrangement mentioned above, the antenna array can easily be combined integrally with the mirror.

In a further preferred mode for carrying out the invention, the microstrip antenna array may be formed only in a lateral region of the mirror and the radiating elements may be disposed at a front side of the reflecting mirror surface while formed in a lateral region thereof through interposition of the dielectric layer, wherein the reflecting mirror surface is realized by the ground conductor layer in the above-mentioned lateral region.

With the arrangement mentioned above, there can be realized the antenna array which can easily be incorporated integrally with the mirror without impairing the inherent function of the mirror.

In a yet further preferred mode for carrying out the invention, the radiating portion may be constituted by a plurality of radiating sub-portions and include a feeder portion means for feeding electric energy to the radiating sub-portions, respectively, and a plurality of variable phase shifters for setting different excitation phases for the radiating sub-portions, respectively, through the feeder portion means.

With the arrangement, there can be realized the antenna/mirror combination apparatus in which the radio wave radiating direction from the radiating portion can be adjusted.

Thus, the antenna/mirror combination apparatus is especially suited for installation on a motor vehicle.

In a still further preferred mode for carrying out the invention, the mirror having the reflecting mirror surfaces serving also as the radiating sub-portions, respectively, may be implemented rotatably. In that case, the radiating sub-portions may be juxtaposed with one another in a direction corresponding to a rotational axis of the mirror. Further, the variable phase shifters may be so designed as to set the excitation phases for the radiating sub-portions, respectively, such that physical displacements of the radiating sub-portions as brought about upon rotation of said mirror can be electrically canceled out.

With the arrangement, there can be realized the antenna/mirror combination apparatus in which the radiating direction can be maintained to be constant.

In a preferred mode for carrying out the invention, each of the variable phase shifters may be composed of a feed line and a probe disposed movably in opposition to the feed line. In that case, the position of the probe relative to the feed line can be displaced in conformance with an angle of rotation of the mirror to thereby set variably the excitation phase.

With the arrangement mentioned above, there can be realized the antenna/mirror combination apparatus in which the radiating direction can be maintained to be constant.

In another preferred mode for carrying out the invention, the feed line may be constituted by a microstrip line having a ground conductor layer disposed oppositely through an interposed dielectric layer, and the probe may be brought into slidable contact with the microstrip line under pressure to be thereby electrically connected to the microstrip line.

By virtue of the arrangement mentioned above, there can be realized the antenna/mirror combination apparatus in which the radiating direction can be maintained to be constant with a simple structure.

In yet another preferred mode for carrying out the invention, the feed line may be constituted by a waveguide having a slot formed therein with the probe being inserted into the slot so as to be movable along the slot.

Owing to the arrangement mentioned above, there can be realized the antenna/mirror combination apparatus in which the radiating direction can be maintained to be constant with a simple structure.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
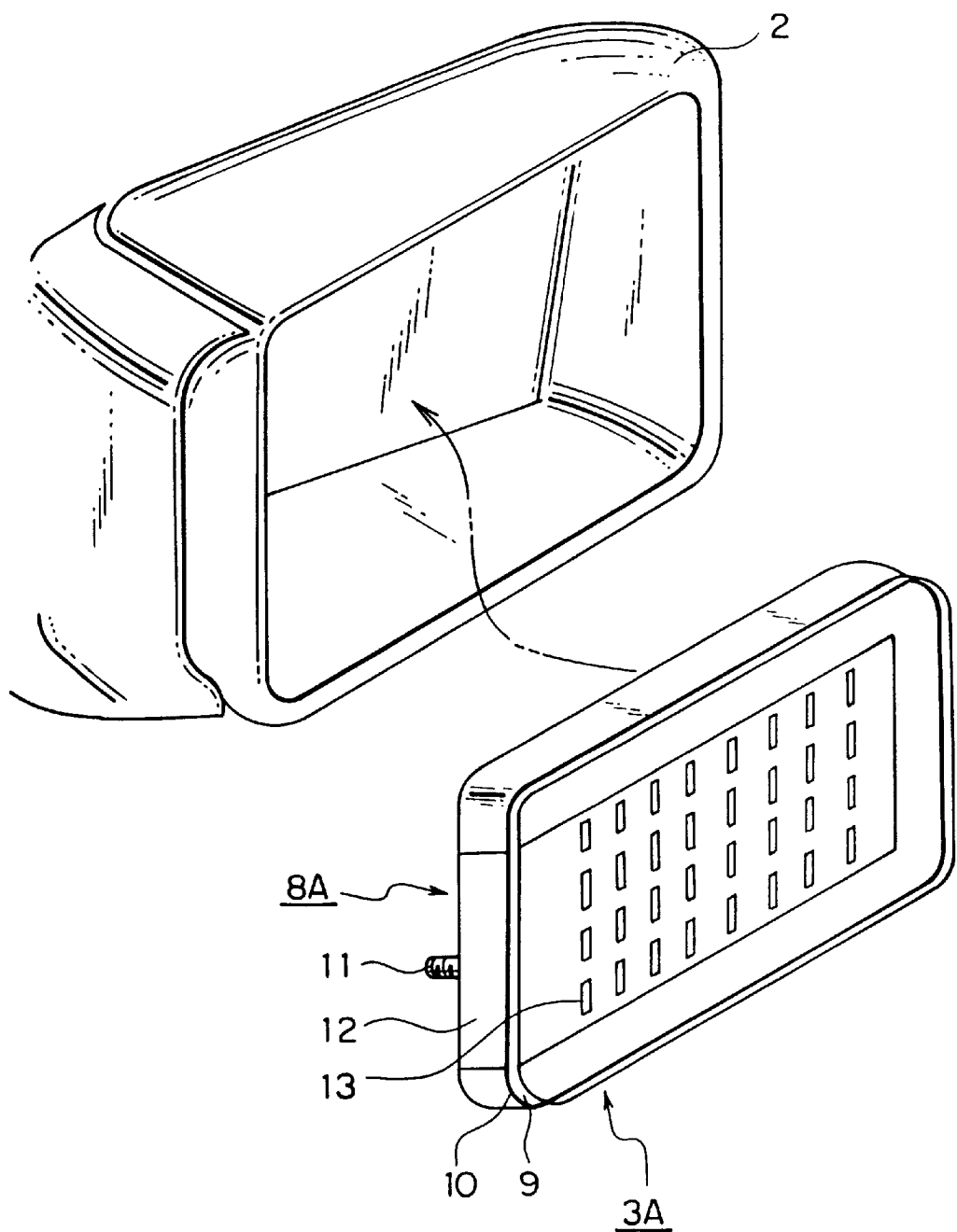
FIG. 1 is a perspective view showing in a developed state an antenna/mirror combination apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "front", "rear", "top", "bottom", "upper", "lower" and the like are words of convenience and are not to be construed as limiting terms.

Embodiment 1

Now, referring to the drawings, description will be made of an antenna/mirror combination apparatus according to a first embodiment of the present invention.

Figure 21:
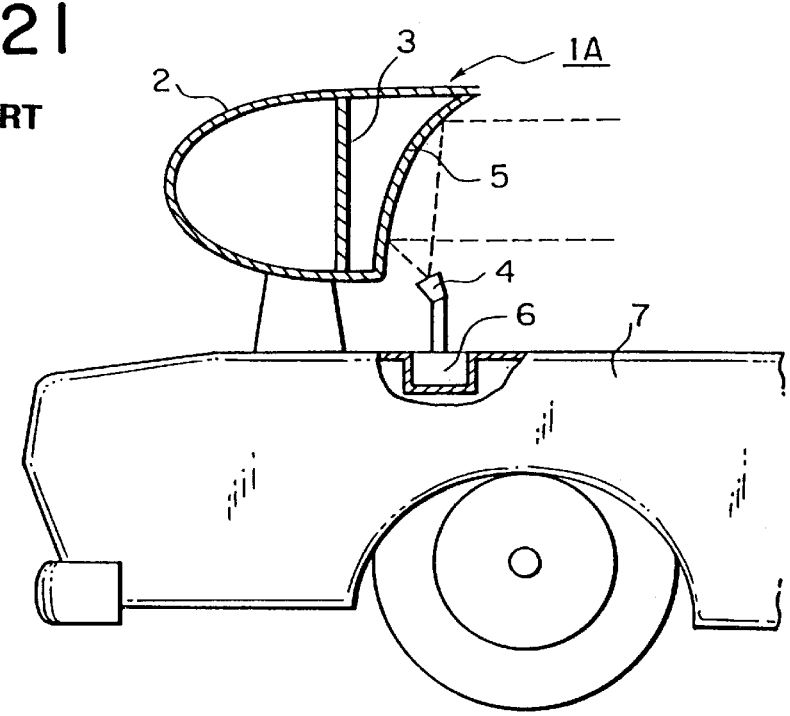
FIG. 21 is a sectional side elevational view showing schematically a structure of a conventional antenna apparatus.
Figure 22:
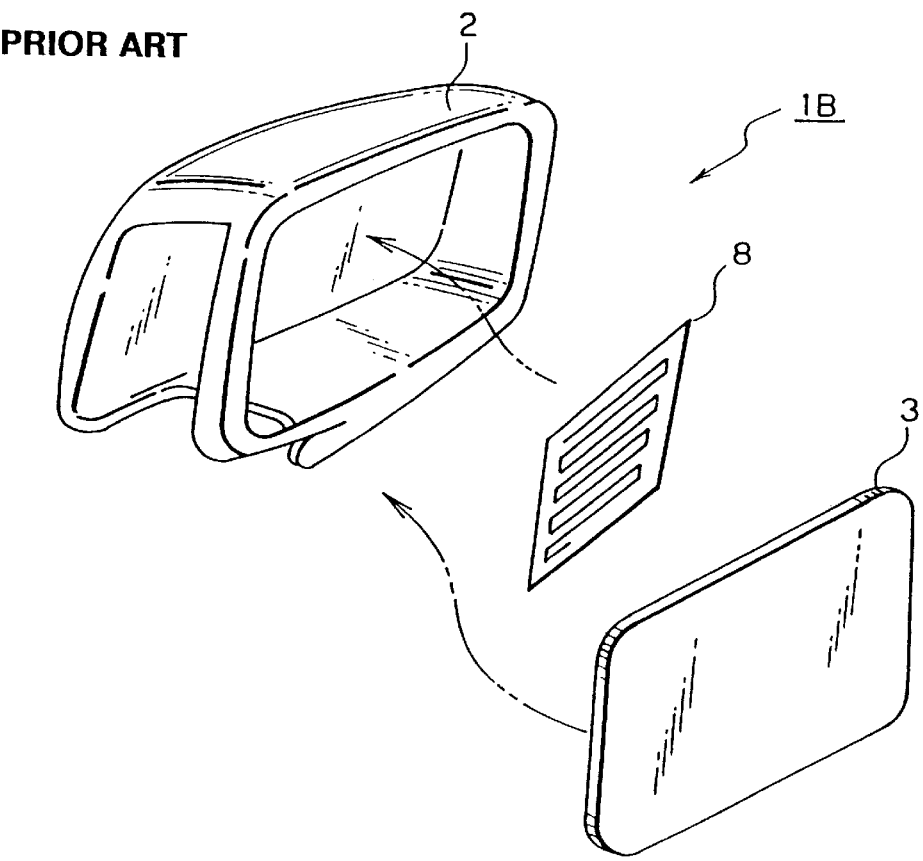
FIG. 22 is a perspective view showing schematically in a developed state another structure of a hitherto known antenna/mirror combination apparatus.

FIG. 1 is a perspective view showing in a developed state an antenna/mirror combination apparatus according to the first embodiment of the invention. In the figure, a mirror case 2 is implemented in a structure similar to those mentioned hereinbefore by reference to FIGS. 21 and 22.

Further, a mirror 3A and a low-profile antenna 8A functionally correspond to the mirror 3 and the low-profile antenna 8 mentioned hereinbefore, respectively.

Figure 2:
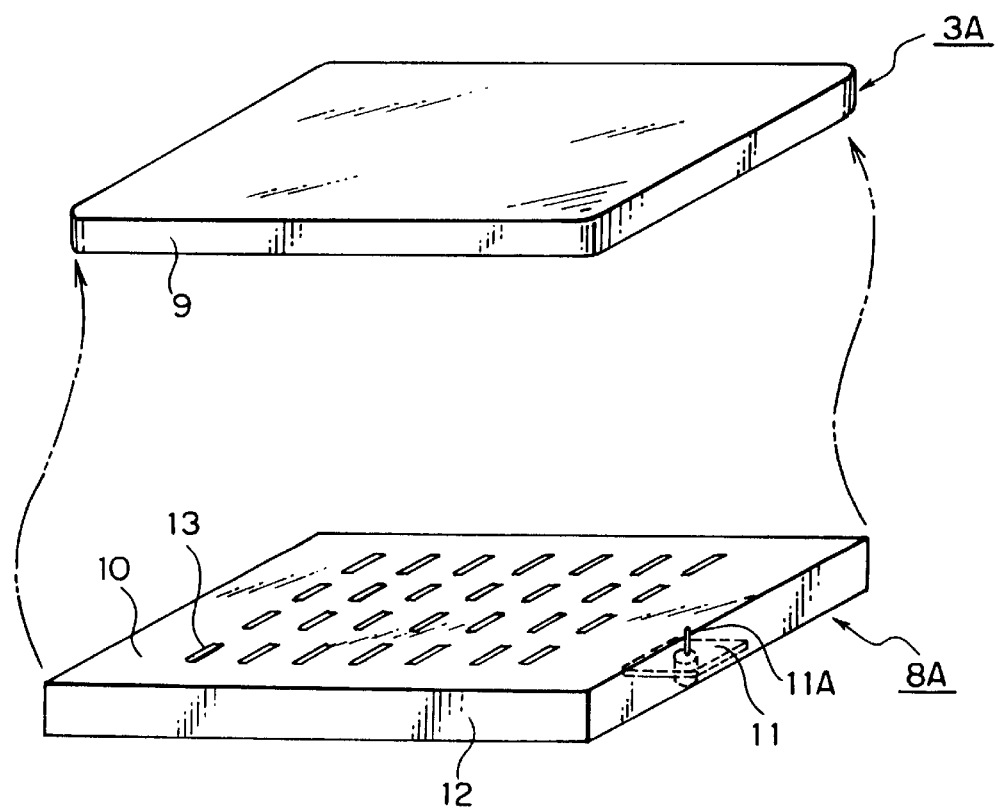
FIG. 2 is a perspective view showing in a developed state a mirror and a low-profile antenna of the antenna/mirror combination apparatus shown in FIG. 1.
Figure 3:
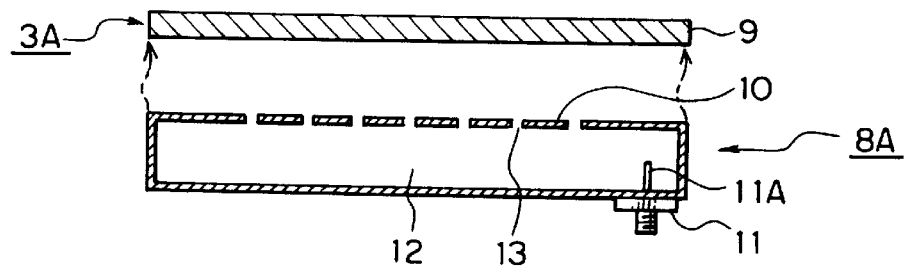
FIG. 3 is a side elevational view showing the same equally in a developed state.

FIG. 2 is a perspective view showing the mirror 3A and the low-profile antenna 8A in a developed state, and FIG. 3 is a side elevational view showing the same also in a developed state.

As can be seen in FIGS. 1 to 3, the mirror 3A is comprised of a front glass plate 9 disposed in such an orientation as to cover the visual field of the mirror 3A (e.g. facing rearwardly as viewed in a forward running direction of a motor vehicle) and a reflecting mirror surface 10 fixedly secured to a rear surface of the front glass plate 9.

The low-profile antenna 8A is disposed at the rear side of the mirror 3A and combined integrally therewith. As can be seen most clearly from FIG. 3, the low-profile antenna 8A is comprised of a feeder portion 11 electrically connected to an external feed line (described later on), a waveguide 12 formed of a metal and implemented in a box-like structure and a slot array including a plurality of slots 13 formed in a top wall of the waveguide 12 (see FIGS. 2 and 3). Parenthetically, reference numeral 13 is used for designating the individual slots and collectively the slot array.

The slot array 13 formed in the waveguide 12 constitutes a radiating portion (electrically conductive antenna element) of the low-profile antenna 8A.

The feeder portion 11 is provided with an inner conductor of the feeder portion 11A projecting internally of the waveguide 12 which serves to radiate radio wave from the slot array 13 under power supply through the feeder portion 11.

The slot array 13 includes a plurality of slots disposed in an array to constitute the radiating portion (and receiving portion) for the radio wave. On the other hand, the substantially whole top surface top wall of the waveguide 12 exclusive of those areas corresponding to the slots functions as the reflecting mirror surface 10 of the mirror 3A.

Thus, by disposing the front glass plate 9 in superposition on the top wall of the waveguide 12 and securing the former tightly and snugly to the latter, the mirror 3A having the reflecting mirror surface 10 is implemented, wherein at least a part of the slot array 13 functions also as a part of the reflecting mirror surface 10.

In this conjunction, it should be noted that each of the slots constituting the slot array 13 has an extremely small width. Thus, provision of the slot array 13 in the reflecting mirror surface 10 presents substantially no obstacle to the intrinsic function of the mirror 3A (capability of observing the visual field).

Next, description will turn to operation of the antenna/mirror combination apparatus shown in FIGS. 1 to 3 on the assumption, by way of example only, that the low-profile antenna 8A functions as a radio wave transmitting antenna, being understood that the low-profile antenna 8A can of course function as the radio wave receiving antenna because of the reciprocity inherent to the antenna as known generally in the art.

The radio wave excited into the waveguide 12 from the feeder portion 11 travels through the waveguide 12 to be radiated into the outer space through the slots of the slot array 13. In this connection, it should be noted that the width of each of the slots formed in the slot array 13 is selectively so dimensioned that essentially no influence is exerted to the radiation characteristics of the low-profile antenna 8A.

On the other hand, the upper surface of the top wall of the metallic waveguide 12 can function as the reflector of the reflecting mirror surface 10 which constitutes the mirror 3A in cooperation with the front glass plate 9 secured tightly onto the upper surface of the waveguide 12. In this conjunction, the width of each slot formed in the slot array 13 can be selected to be minimum so that the visual field observing capability of the mirror 3A undergoes substantially no degradation.

By providing the slot array 13 in the reflecting mirror surface 10 of the mirror 3A to such extent that substantially no adverse influence is exerted onto the visual field observing capability or performance of the mirror, as described above, the low-profile antenna 8A can be integrally incorporated in the mirror 3A.

In the structure of the antenna/mirror combination apparatus, the low-profile antenna 8A is disposed simply in superposition onto the rear surface of the front glass plate 9 of the mirror 3A. Thus, the antenna/mirror combination apparatus according to the instant embodiment of the invention can be realized inexpensively in a small or compact size without increasing the number of the constituent parts.

Furthermore, by accommodating the low-profile antenna 8A within the mirror case 2 and combining the low-profile antenna 8A integrally with the mirror 3A, there arises substantially no necessity of increasing the inner space of the mirror case 2 for affording the installation of the low-profile antenna 8A when compared with that of the mirror case 2 where only the mirror 3A is accommodated. Thus, the antenna/mirror combination apparatus according to the instant embodiment of the invention can be realized in a miniaturized structure.

Further, by virtue of such arrangement that the radiating portion (i.e., the slot array 13) of the low-profile antenna 8A is formed at least in a portion or region of the reflecting mirror surface 10 constituting the mirror 3A, the radio waves can be radiated in the direction which coincides with the visual field of the mirror 3A. Thus, the degree of freedom in design can be protected against restriction ascribable to the integral combination of the low-profile antenna 8A with the mirror 3A.

Embodiment 2

In the case of the antenna/mirror combination apparatus according to the first embodiment of the invention, the top wall or top surface of the waveguide 12 is so designed to function as the reflecting mirror surface layer 10 of the mirror 3A. However, substantially same advantageous effects can be obtained by forming the reflecting mirror surface layer 10 on the rear surface of the front glass plate 9 through a printing process. A second embodiment of the present invention is directed to this structure.

Figure 4:
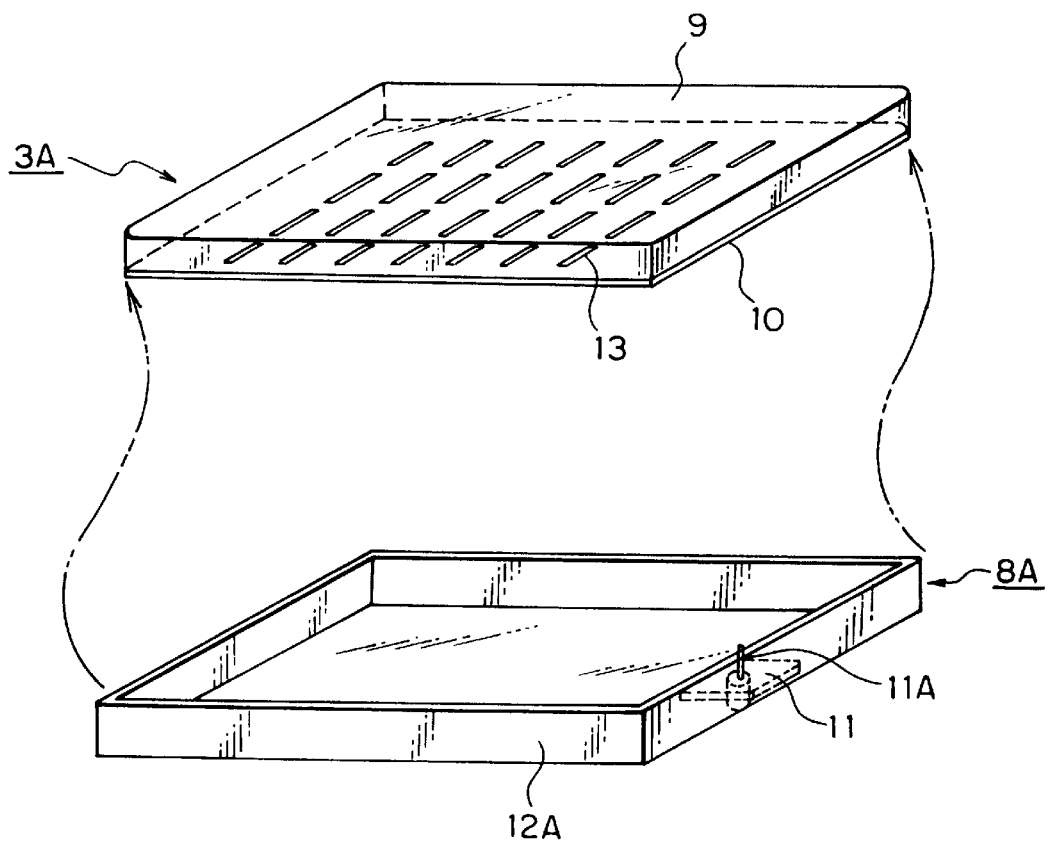
FIG. 4 is a perspective view showing in a developed state a mirror and a low-profile antenna of an antenna/mirror combination apparatus according to a second embodiment of the present invention.
Figure 5:
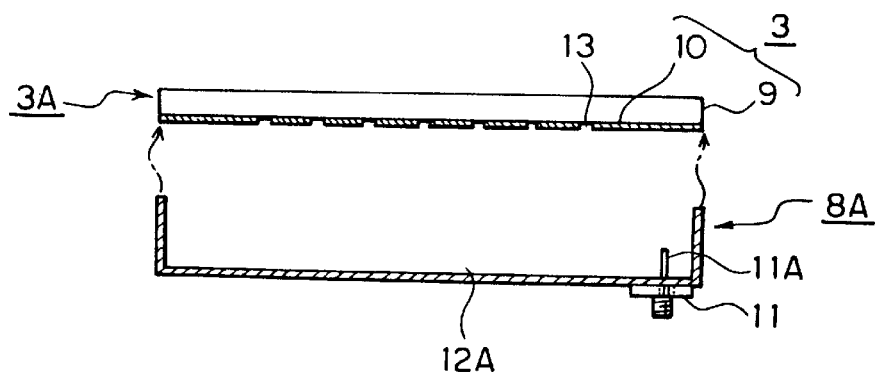
FIG. 5 is a side elevational view showing the same also in a developed state.

FIG. 4 is a perspective view showing in a developed state the mirror 3A and the low-profile antenna 8A of the antenna/mirror combination apparatus according to a second embodiment of the present invention, in which the reflecting mirror surface layer 10 is formed on the rear surface of the front glass plate 9 through a printing process and FIG. 5 is a side elevational view showing the same also in a developed state.

In FIGS. 4 and 5, the components same as or equivalent to those described hereinbefore by reference to FIGS. 1 to 3 are denoted by like reference characters and repeated description thereof is omitted.

The waveguide 12A corresponds to the waveguide 12 mentioned previously and is implemented in the form of a box-like integral structure with the reflecting mirror surface layer 10 being secured atop.

More specifically, referring to FIGS. 4 and 5, the reflecting mirror surface layer 10 formed on the rear surface of the front glass plate 9 is formed with the slot array 13, wherein the front glass plate 9 is disposed in superposition on the waveguide 12A with the reflecting mirror surface layer 10 facing the waveguide 12A. Thus, the slot array 13 formed in the reflecting mirror surface layer 10 is electrically and mechanically connected to the waveguide 12A, whereby the low-profile antenna 8A (slot antenna array) can be integrally incorporated in the mirror 3A.

By making the top surface of the low-profile antenna 8A coincide with the reflecting mirror surface layer 10 of the mirror 3A in this manner, the slot array 13 can be used as an integral portion of the reflecting mirror surface layer 10. In this way, the antenna/mirror combination apparatus can be implemented inexpensively in a small or compact structure without incurring degradation in the degree of freedom in design.

Besides, since the reflecting mirror surface layer 10 and the slot array 13 can be formed by resorting to an etching process suited for a mass production, the manufacturing cost of the antenna/mirror combination apparatus can further be reduced.

Embodiment 3

In the case of the antenna/mirror combination apparatus according to the first embodiment of the invention, the low-profile antenna incorporated integrally in the mirror 3A is realized in the form of the slot antenna array 8A including the waveguide. However, the antenna/mirror combination apparatus according to the invention can be realized by using a microstrip antenna array including a radiating element and a ground conductor layer.

Figure 6:
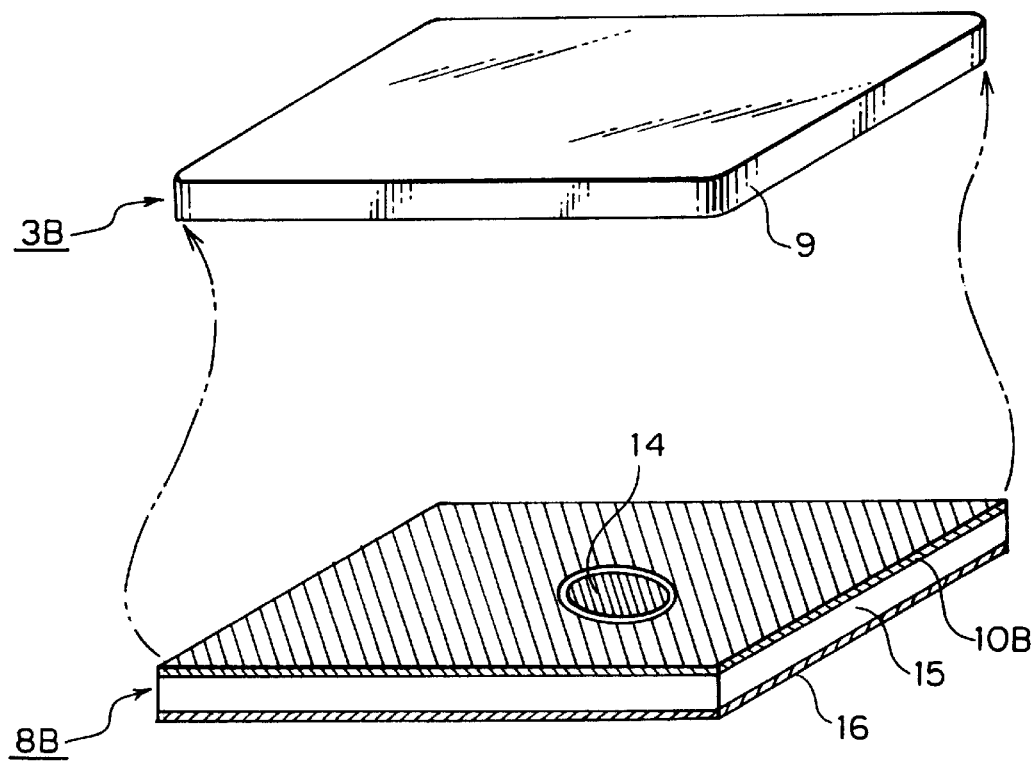
FIG. 6 is a perspective view showing in a developed state a mirror and a low-profile antenna of an antenna/mirror combination apparatus according to a third embodiment of the present invention.
Figure 7:
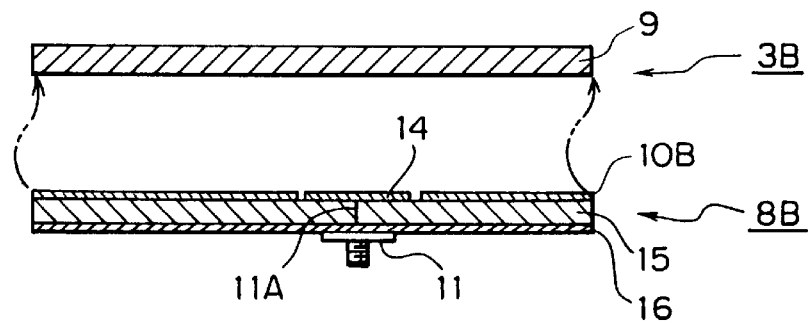
FIG. 7 is a side elevational view showing the same also in a developed state.

FIG. 6 is a perspective view showing in a developed state a mirror 3B and a low-profile antenna 8B of the antenna/mirror combination apparatus according to a third embodiment of the present invention, in which a microstrip antenna array is employed, and FIG. 7 is a side elevational view showing the same also in a developed state.

In FIGS. 6 and 7, the components same as or equivalent to those described hereinbefore are denoted by like reference characters and repeated description thereof is omitted.

In these figures, the mirror 3B, the low-profile antenna 8B and a reflecting mirror surface layer 10B correspond to the mirror 3A, the low-profile antenna 8A and the reflecting mirror surface layer 10 described hereinbefore, respectively.

The low-profile antenna 8B is constituted by a microstrip antenna array which includes a feeder portion 11, a radiating element 14 constituting a radiating portion of the low-profile antenna 8B, and a ground conductor layer 16.

In the antenna/mirror combination apparatus now under consideration, the inner conductor 11A constituting a part of the feeder portion 11 has a tip end placed in physical contact with the radiating element 14 for supplying electric energy thereto. Further, the ground conductor layer 16 is electrically coupled to a ground of the feeder portion 11.

The reflecting mirror surface layer 10B of a metallic material and the radiating element 14 are formed on the top surface of a dielectric layer 15 through a printing process, wherein the front glass plate 9 is mounted or secured tightly onto the top surface of the dielectric layer 15. Thus, the mirror 3B essentially integrated with the reflecting mirror surface layer 10B can be realized.

The reflecting mirror surface layer 10B of the mirror 3B is formed around the radiating element 14 in a same plane as the latter, wherein the radiating element 14 serves also for the function of the reflecting mirror surface layer 10B. To say in another way, the radiating element 14 is formed by a part of the reflecting mirror surface layer 10B. In the case of the antenna/mirror combination apparatus shown in FIGS. 6 and 7, the radiating element 14 has a circular shape. It should however be mentioned that the present invention is never restricted to such specific shape of the radiating element 14. In other words, the radiating element 14 may be realized in any given shape within the spirit and scope of the invention.

In the antenna/mirror combination apparatus of the structure described above in which the low-profile antenna 8B is integrally incorporated in the mirror 3B, the electromagnetic energy fed to the low-profile antenna 8B through the feeder portion 11 is radiated to the exterior or outer space from the radiating element 14. Thus, the radio wave can be radiated in the direction corresponding to the field of view of the mirror 3B.

In the antenna/mirror combination apparatus of the structure described above, the gap isolating the reflecting mirror surface layer 10B and the radiating element 14 from each other is extremely small. Thus, the field of view of the mirror 3B is essentially unaffected.

Besides, because the reflecting mirror surface layer 10B and the radiating element 14 can be formed on the dielectric layer 15 by resorting to an etching process suited for a mass production, the manufacturing cost of the antenna/mirror combination apparatus according to the instant embodiment of the invention can be reduced significantly.

Embodiment 4

In the case of the antenna/mirror combination apparatus according to the third embodiment of the invention, the reflecting mirror surface layer 10B and the radiating element 14 are formed on the top surface of the dielectric layer 15. However, they may be formed on the rear surface of the front glass plate 9. The fifth embodiment of the invention is directed to this structure.

Figure 8:
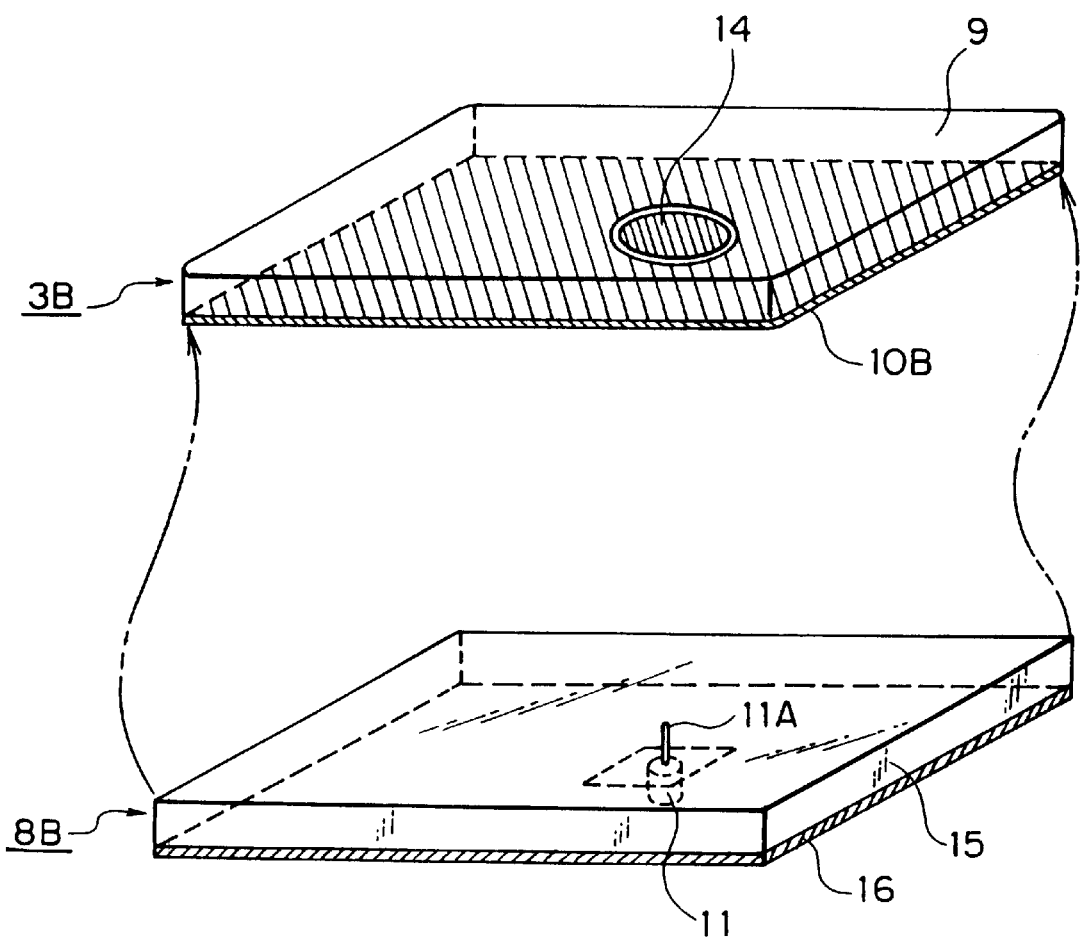
FIG. 8 is a perspective view showing in a developed state a mirror and a low-profile antenna of an antenna/mirror combination apparatus according to a fourth embodiment of the present invention.
Figure 9:
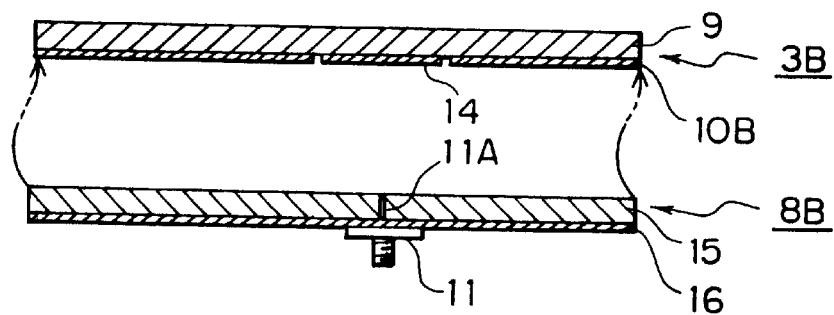
FIG. 9 is a side elevational view showing the same also in a developed state.

FIG. 8 is a perspective view showing in a developed state a mirror 3B and a low-profile antenna 8B of the antenna/mirror combination apparatus according to a fourth embodiment of the present invention, in which the reflecting mirror surface layer 10B and the radiating element 14 are formed on the rear surface of the front glass plate 9, and FIG. 9 is a side elevational view showing the same also in a developed state.

In FIGS. 8 and 9, the components same as or equivalent to those described hereinbefore are denoted by like reference characters and repeated description thereof is omitted.

In the case of the antenna/mirror combination apparatus now concerned, the reflecting mirror surface layer 10B and the radiating element 14 are formed on the rear surface of the front glass plate 9 by resorting to a printing process.

Thus, by securing tightly the dielectric layer 15 on the rear surface of the front glass plate 9 together with the feeder portion 11 and the ground conductor layer 16, there can be realized the low-profile antenna 8B combined essentially integrally with the mirror.

By forming the radiating element 14 on the reflecting mirror surface layer 10B located at the rear side of the front glass plate 9 through an etching process and coupling electrically and mechanically the radiating element 14 and the feeder portion 11 to each other for thereby combining the low-profile antenna 8B integrally with the mirror 3B, the reflecting mirror surface layer 10B can serve also as a part of the low-profile antenna 8B, whereby advantageous effects as mentioned hereinbefore can be ensured.

Embodiment 5

In the case of the antenna/mirror combination apparatuses according to the third and fourth embodiments of the present invention, the low-profile antenna 8B (including the radiating element 14) is so formed as to be positioned at a center region of the mirror 3B (the reflecting mirror surface layer 10B). However, the low-profile antenna (radiating element) may be so formed as to be located at a lateral region of the mirror 3B.

Figure 10:
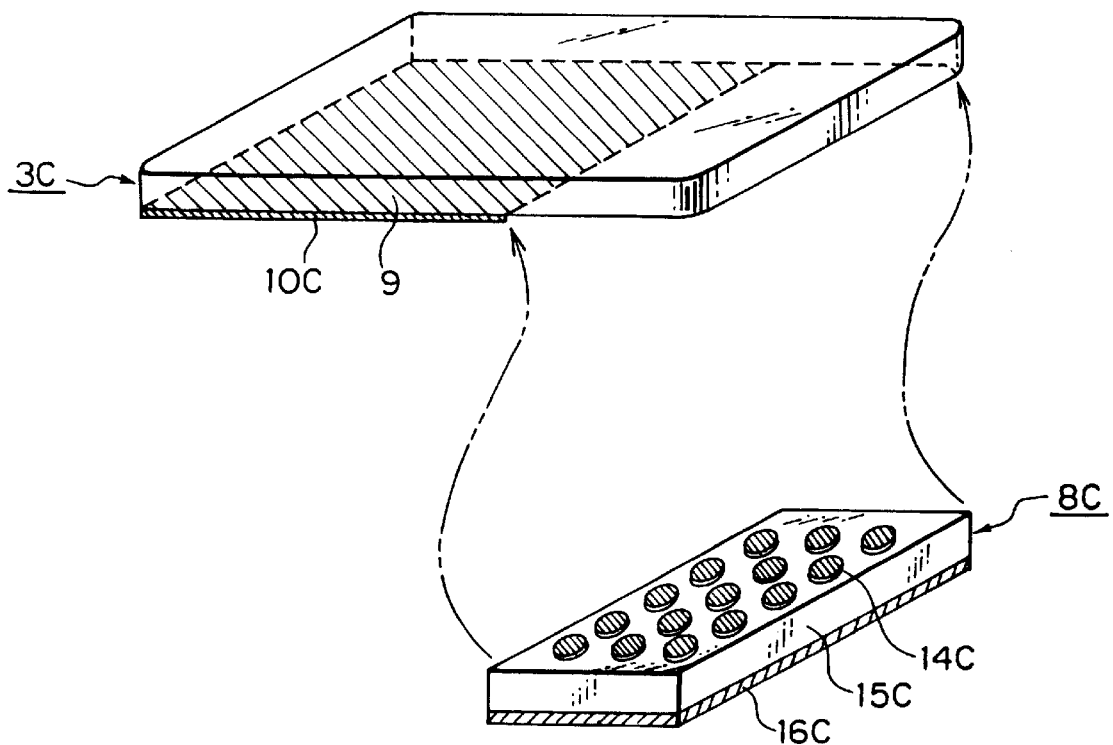
FIG. 10 is a perspective view showing in a developed state a mirror and a low-profile antenna of an antenna/mirror combination apparatus according to a fifth embodiment of the present invention.
Figure 11:
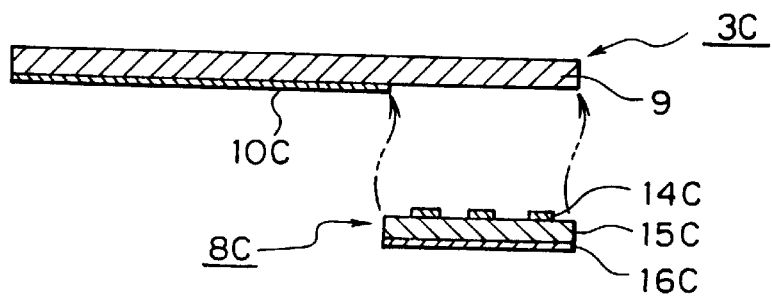
FIG. 11 is a side elevational view showing the same also in a developed state.

FIG. 10 is a perspective view showing in a developed state a mirror 3C and a low-profile antenna 8C of the antenna/mirror combination apparatus according to a fifth embodiment of the present invention, in which the low-profile antenna is formed in a peripheral or lateral region of the mirror 3C, and FIG. 11 is a side elevational view showing the same also in a developed state.

In FIGS. 10 and 11, components same as or equivalent to those described hereinbefore are denoted by like reference characters and thus repeated description thereof will be unnecessary.

In the figures, a mirror 3C, a low-profile antenna 8C, a reflecting mirror surface layer 10C, radiating elements 14C, a dielectric layer 15C and a ground conductor layer 16C correspond to the mirror 3A, the low-profile antenna 8A, the reflecting mirror surface layer 10, the radiating element 14, the dielectric layer 15 and the ground conductor layer 16 mentioned hereinbefore, respectively. Parenthetically, the feeder portion 11 (see FIGS. 8 and 9) is omitted from illustration for the sake of simplification.

In the case of the antenna/mirror combination apparatus according to the instant embodiment of the invention, the low-profile antenna 8C implemented in the form of the microstrip antenna array is formed only in a peripheral or lateral region of the mirror 3C, wherein the radiating portion of the low-profile antenna 8C is constituted by a radiating element array including a plurality of radiating elements 14C. The individual radiating elements 14C are disposed uniformly on the dielectric layer 15C, being formed through an etching process or the like.

The reflecting mirror surface layer 10C is absent over the area of the rear surface of the front glass plate 9 which corresponds to the low-profile antenna 8C, and the low-profile antenna 8C having the radiating elements 14C is tightly deposited over this area. Further, the top surfaces of the radiating elements 14C are contacted to the rear surface of the front glass plate 9 so as to serve also as a part of the reflecting mirror surface layer of the mirror 3C.

At this juncture, it should be mentioned that the dielectric layer 15C and the ground conductor layer 16C are provided only at the rear side of the radiating elements 14C.

By virtue of the structure of the antenna/mirror combination apparatus in which the low-profile antenna 8C is provided only in one peripheral or lateral region of the mirror 3C so that the top surface of the reflecting mirror surface layer 10C and those of the radiating elements lie flush with each other, the mirror 3C and the low-profile antenna 8C can be integrated with each other without impairing the field of view and the viewing performance of the mirror 3C while allowing the radio waves to be radiated in the direction covering the visual field of the mirror 3C.

Besides, because the dielectric layer 15C and the ground conductor layer 16C are provided to a necessary minimum only at the rear side of the radiating elements 14C, the antenna/mirror combination apparatus can be realized in a small or compact size at low cost.

It is, however, to be added that when an offset portion makes appearance unfavorably on the rear surface of the mirror 3C, the dielectric layer 15C and the ground conductor layer 16C may be deposited substantially over the whole rear surface of the mirror 3C for eliminating such offset.

Embodiment 6

In the case of the antenna/mirror combination apparatus according to the fifth embodiment of the present invention, the radiating elements 14C are formed on the top surface of the dielectric layer 15C. However, the radiating elements 14C may be formed on the rear surface of the front glass plate 9, substantially to same effects.

Figure 12:
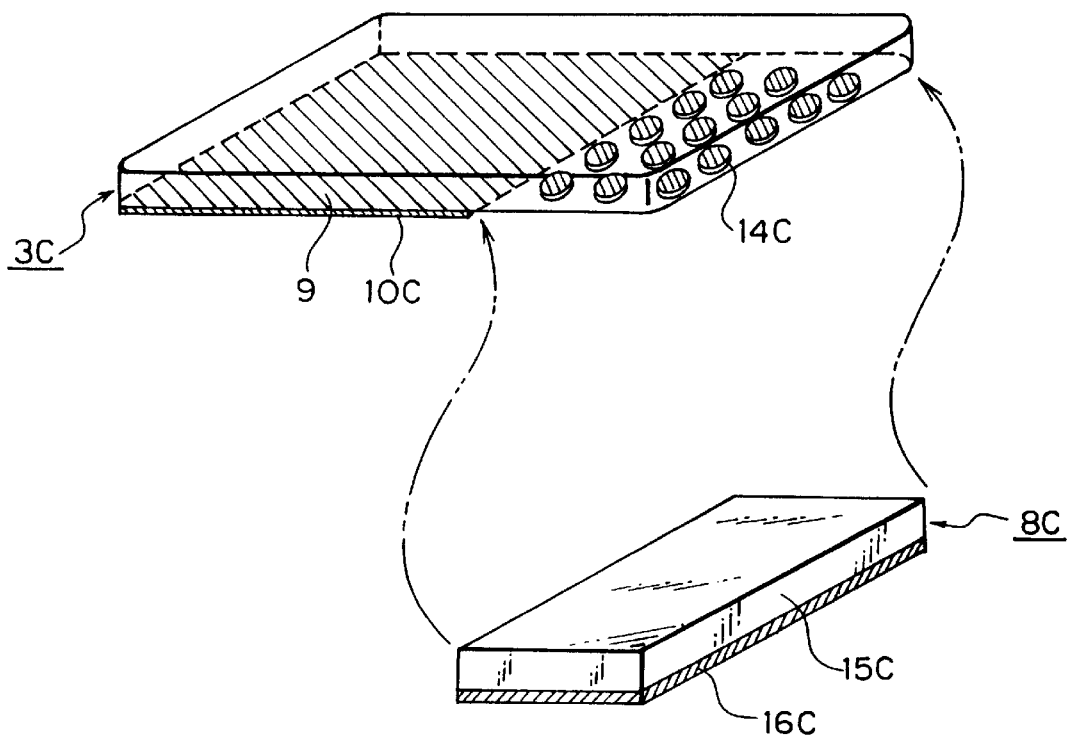
FIG. 12 is a perspective view showing in a developed state a mirror and a low-profile antenna of an antenna/mirror combination apparatus according to a sixth embodiment of the present invention.
Figure 13:
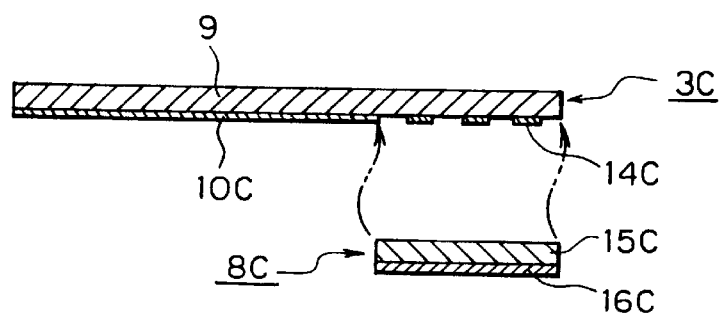
FIG. 13 is a side elevational view showing the same in a developed state.

FIG. 12 is a perspective view showing in a developed state a mirror 3C and a low-profile antenna 8C of the antenna/mirror combination apparatus according to a sixth embodiment of the invention, in which the radiating elements 14C are formed on the rear surface of the front glass plate 9, and FIG. 13 is a side elevational view showing the same.

In FIGS. 12 and 13, the components same as or equivalent to those described hereinbefore (see FIGS. 10 and 11) are denoted by like reference characters and repeated description thereof is omitted.

In the case of the antenna/mirror combination apparatus now of concern, the radiating elements 14C of the low-profile antenna 8C are formed on the rear surface of the front glass plate 9, being flush with the reflecting mirror surface layer 10C through a printing process.

By securing tightly the dielectric layer 15C onto the rear surface of the front glass plate 9 in one lateral region thereof together with the feeder portion (not shown) and the ground conductor layer 16C, the feeder portion (not shown) is electrically and mechanically connected to the radiating elements 14C at rear side thereof, whereby there can be realized the low-profile antenna 8C combined essentially integrally with the mirror.

In the antenna/mirror combination apparatus according to the instant embodiment of the invention, only the array of the radiating elements 14C is formed on the rear surface of the front glass plate 9 in one lateral region. However, feed line such as microstrip line (not shown) for a plurality of radiating elements 14C may be formed on the same surface through a printing process. In that case, a feeder portion common to a plurality of feed line may be provided at one location.

By forming the radiating elements 14C in one lateral region of the mirror 3C so as to be flush with the reflecting mirror surface layer 10C, the antenna/mirror combination apparatus can be fabricated through a single etching process. Thus, the manufacturing cost of the antenna/mirror combination apparatus can further be reduced. Of course, the advantageous effects mentioned hereinbefore can be obtained.

Embodiment 7

In the case of the antenna/mirror combination apparatuses according to the fifth and sixth embodiments of the present invention, the radiating elements 14C are so formed as to be positioned on the same plane as the reflecting mirror surface layer 10C of the mirror 3C. However, the ground conductor layer may be so formed as to be flush with the reflecting mirror surface layer.

Figure 14:
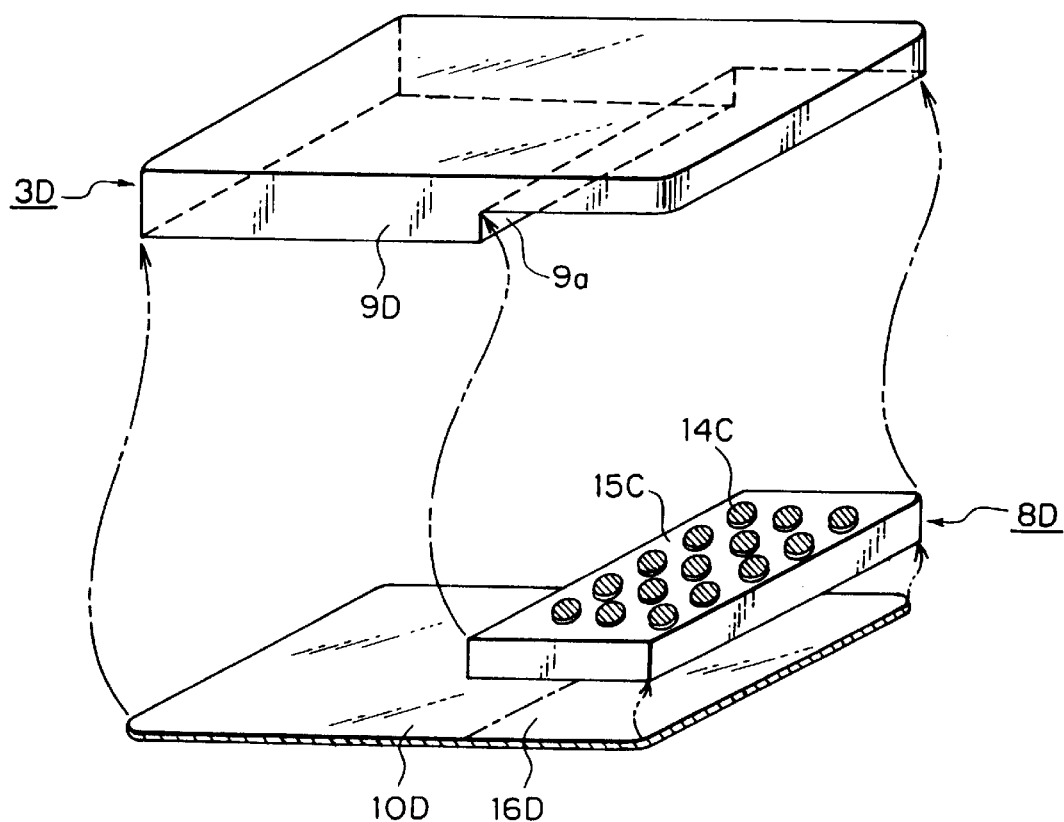
FIG. 14 is a perspective view showing in a developed state a mirror and a low-profile antenna of an antenna/mirror combination apparatus according to a seventh embodiment of the present invention.
Figure 15:
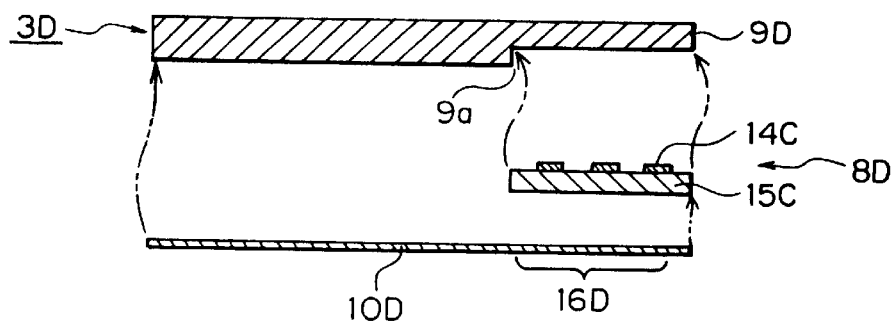
FIG. 15 is a side elevational view showing the same also in a developed state.

FIG. 14 is a perspective view showing in a developed state a mirror 3D and a low-profile antenna 8D of the antenna/mirror combination apparatus according to a seventh embodiment of the present invention, in which a part of a reflecting mirror surface layer 10D is also used as the ground conductor layer, and FIG. 15 is a side elevational view showing the same also in a developed state.

In FIGS. 14 and 15, components same as or equivalent to those described hereinbefore are denoted by like reference characters and thus repeated description thereof will be unnecessary.

In the above figures, a mirror 3D, a low-profile antenna 8D, a front glass plate 9D, a reflecting mirror surface layer 10D and a ground conductor layer 16D correspond to the mirror 3C, the low-profile antenna 8C, the front glass plate 9, the reflecting mirror surface layer 10C and the ground conductor layer 16C mentioned hereinbefore, respectively. Incidentally, the feeder portion 11 (see FIGS. 8 and 9) is omitted from illustration for the simplification of illustration.

In the case of the antenna/mirror combination apparatus now under consideration, the ground conductor layer 16D of the low-profile antenna 8D is formed integrally with the reflecting mirror surface layer 10D at one end or side thereof.

On the other hand, the front glass plate 9D has a notched portion 9a formed in the rear surface at one end or side thereof over an area corresponding to the size of the low-profile antenna 8D, wherein the dielectric layer 15C having the radiating elements 14C is mounted tightly or snugly in the notched portion 9a.

The reflecting mirror surface layer 10D formed of a metallic material integrally with the ground conductor layer 16D can be deposited over the rear surfaces of the front glass plate 9D and the dielectric layer 15C, respectively, through metal evaporation process or by bonding.

By combining the low-profile antenna 8D integrally with the mirror 3D in such structure that the reflecting mirror surface layer 10D and the ground conductor layer are flush with each other, there can be realized the antenna/mirror combination apparatus which ensures the advantageous effects mentioned previously.

In the antenna/mirror combination apparatus according to the instant embodiment of the invention, the radiating elements 14C are formed on the dielectric layer 15C. However, the radiating elements 14C may be deposited on the rear surface of the notched portion 9a formed in the front glass plate 9D. Further, the low-profile antenna 8D may be formed at a center portion of the mirror 3D in place of the lateral region thereof.

Although it has been described that the ground conductor layer 16D is employed as the electrically conductive antenna element which serves also as a part of the reflecting mirror surface layer 10D, it goes without saying that other electrically conductive antenna element may be used so far as it can function also as the reflecting mirror surface layer for the visible light rays.

Embodiment 8

In the case of the antenna/mirror combination apparatuses according to the first to seventh embodiments described above, no consideration is paid to compensation for the change of the radiating plane or surface of the low-profile antenna, which change may be brought about upon mirror rotating operation. With a view to compensating for such change of the radiating surface, variable phase shifters may be provided for applying different excitation phases to a plurality of divided radiating portions, respectively, for thereby changing the excitation phases so as to cancel out the changes of the radiating surface occurring upon rotation of the mirror.

Figure 16:
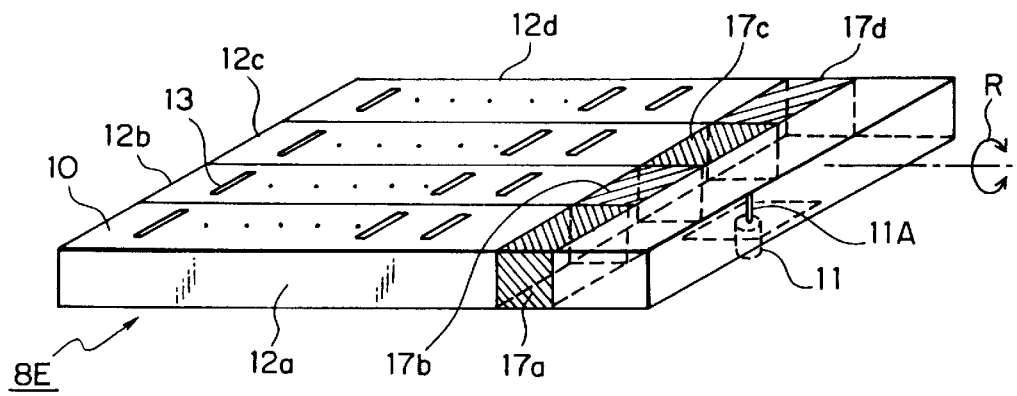
FIG. 16 is a perspective view showing schematically a low-profile antenna according to an eighth embodiment of the present invention.

FIG. 16 is a perspective view showing schematically a low-profile antenna 8E according to an eighth embodiment of the present invention, in which variable phase shifters are employed. In this conjunction, it is assumed, only by way of example, that the low-profile antenna 8E is constituted by a slot-type antenna array.

In FIG. 16, components same as or equivalent to those described hereinbefore are denoted by like reference characters and repeated description thereof is omitted. The other structural features are essentially same as those shown in FIG. 1.

Although the slot-type antenna array is employed as the low-profile antenna 8E, it goes without saying that other type antenna array may be used.

In the case of the antenna/mirror combination apparatus now under consideration, the low-profile antenna 8E includes a plurality of waveguides 12a to 12d, wherein a slot array 13 including a plurality of slots arrayed in the longitudinal direction is formed in each of the waveguides 12a to 12d.

The mirror (not shown) having the reflecting mirror surface layer 10 which also serves as the radiating portion realized in the form of the slot array 13 is mounted rotatably in the direction indicated by an arrow R, wherein the slot arrays 13 provided in association with the waveguides 12a to 12d, respectively, are divided in the direction perpendicular to the rotational axis of the mirror. In the case of the antenna/mirror combination apparatus now of concern, the radiating portion is divided into or, to say in another way, constituted by four waveguides 12a to 12d. It should however be appreciated that the radiating portion may be divided into or constituted by a given number of waveguides.

Disposed between the feeder portion 11 and the waveguides 12a to 12d at one ends thereof, respectively, are variable phase shifters 17a to 17d separately for applying or setting different excitation phases for the individual waveguides 12a to 12d, respectively.

Each of the variable phase shifters 17a to 17d is adapted to apply or set the excitation phase for adjusting the phase of the radio wave excited into the associated one of the waveguides 12a to 12d to thereby electrically compensate for a mechanical displacement of the relevant slot array 13 which may be brought about upon rotation of the mirror (see the arrow R).

Next, description will be directed to operation of the antenna/mirror combination apparatus according to the instant embodiment of the invention shown in FIG. 16.

By way of example, the reflecting mirror surface layer 10 is designed to be angularly adjusted as indicated by the arrow R for enabling adjustment of the visual angle or the field of view as desired. In that case, the slot arrays 13 are also caused to rotate together with the reflecting mirror surface layer 10, as a result of which the direction in which the radio wave is radiated from the low-profile antenna 8E changes correspondingly in conformance with the change of angular position of the reflecting mirror surface layer 10.

With a view to suppressing such change of the radiating direction, there are provided the variable phase shifters 17a to 17d which are designed to operate to adjust the phase shifts of the individual waveguides 12a to 12d, respectively, so as to cancel out the change of the angle of the reflecting mirror surface layer 10, to thereby sustain the effective radiating plane to be constant independent of rotation of the mirror. In this way, the direction in which the radio wave is radiated can be maintained to be constant regardless of rotation or angular displacement of the mirror for the adjustment of the field of view.

As is apparent from the above, the direction in which the radio wave is radiated is prevented from varying nevertheless of angular displacement of the mirror which is mounted, for example, on a motor vehicle. Thus, the inherent function of the antenna incorporated in the antenna/mirror combination apparatus can be positively protected against degradation, whereby the reliability of the antenna/mirror combination apparatus can be enhanced advantageously.

Embodiment 9

In the above description of the antenna/mirror combination apparatus according to the eighth embodiment, no consideration is paid to the structure itself of the variable phase shifter. In the antenna/mirror combination apparatus according to a ninth embodiment of the present invention, the variable phase shifter is constituted by a probe disposed mechanically movably in opposition to the feed line or conductor.

Figure 17:
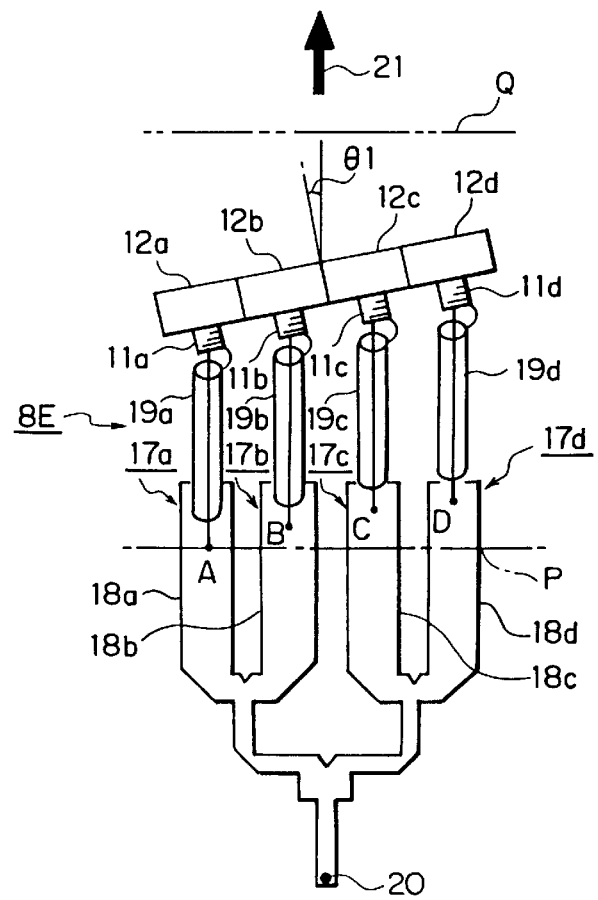
FIG. 17 is a side elevational view showing schematically variable phase shifters employed in an antenna/mirror combination apparatus according to a ninth embodiment of the present invention in a state where the mirror has been rotated by a given angle in the counterclockwise direction.
Figure 18:
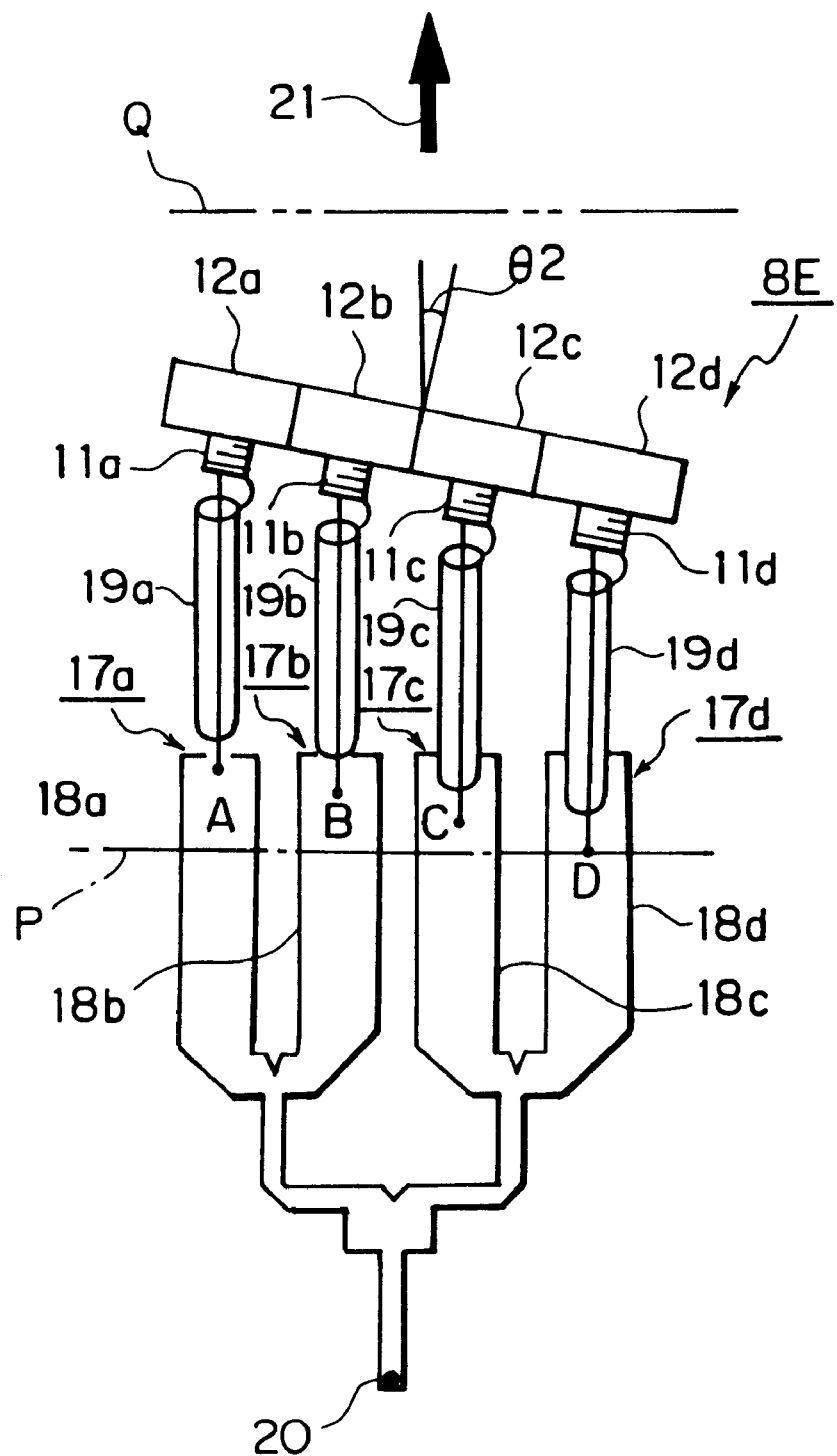
FIG. 18 shows the same in a state where the mirror is rotated by an angle in the clockwise direction.

FIGS. 17 and 18 are side elevational views showing schematically variable phase shifters 17a to 17d employed in the antenna/mirror combination apparatus according to the ninth embodiment of the invention in the states where the mirror is at different angular positions, respectively. More specifically, FIG. 17 shows the variable phase shifters in the state where the mirror has been rotated by an angle θ1 in the counterclockwise direction, while FIG. 18 shows the same in the state where the mirror is rotated by an angle θ2 clockwise.

In FIGS. 17 and 18, the components same as or equivalent to those described hereinbefore are denoted by like reference characters and repeated description thereof is omitted.

As can be seen in the figures, the waveguides 12a to 12d are provided with feeder portions 11a to 11d, respectively.

The variable phase shifters 17a to 17d are constituted by feed lines 18a to 18d and probes 19a to 19d, respectively, wherein the probes 19a to 19d are disposed movably in opposition to the feed lines 18a to 18d, respectively.

Each of the feed lines 18a to 18d has one end connected to a single feed point 20 while one ends of the probes 19a to 19d are electrically connected to the feeder portions 11a to 11d, respectively.

The variable phase shifters 17a to 17d are disposed in opposition to the feed lines 18a to 18d by way of contacts A to D, respectively, wherein the position of the contact A, B, C or D which is located closest to the feed point 20 upon rotation of the mirror is set as a phase reference position P. Further, the radiating direction 21 of the waveguides 12a to 12d is determined by an equiphase plane Q.

Next, operation of the antenna/mirror combination apparatus according to the ninth embodiment of the invention will be described by reference to FIGS. 17 to 18.

When the angle of rotation of the mirror changes from θ1 to θ2, as is illustrated in FIGS. 17 and 18, the angular positions of the waveguides 12a to 12d of the variable phase shifters 17a to 17d are displaced, as shown in FIGS. 17 and 18.

Consequently, the positions of the contacts A to D of the probes 19a to 19d relative to the feed lines 18a to 18d, respectively, change in correspondence to the angular positions of the individual waveguides 12a to 12d, respectively.

In other words, the electrical lengths of the feed lines 18a to 18d and the probes 19a to 19d change in correspondence to the angular positions of the individual waveguides 12a to 12d, respectively, to thereby bring about phase shifts so as to cancel out differences among the angular positions of the waveguides 12a to 12d.

By canceling out the changes in the angular position of the waveguides 12a to 12d by changing the excitation phases by means of the variable phase shifters 17a to 17d, respectively, the electrical distance extending from the phase reference position P to the equiphase plane Q can be sustained to be constant for the individual waveguides 12a to 12d, respectively.

In more concrete, for the waveguide located closest to the equiphase plane Q, the-excitation phase can be regulated in the lagging direction by increasing the electrical length or distance, whereas for the waveguide remote from the equiphase plane Q, the electrical distance is shortened for thereby adjusting the phase in the leading direction. Thus, difference in the rotational or angular positions among the waveguides can be canceled out.

As is apparent from the above, in the antenna/mirror combination apparatus according to the instant embodiment of the invention, the radiating direction 21 can be held constant in the selected or desired direction. Thus, the change of the radiating direction which will otherwise occur upon adjustment of the visual field of the mirror mounted on the motor vehicle or the like can be suppressed effectively.

Embodiment 10

A tenth embodiment of the present invention is directed to a structure of the contacts A to D. More specifically, in the antenna/mirror combination apparatus according to the instant embodiment, the feed lines 18a to 18d are each realized in the form of a microstrip line, wherein the tip end portions of the individual probes are, respectively, put into slideable contact with the microstrip lines under pressure to thereby form the contacts A to D, respectively.

Figure 19:
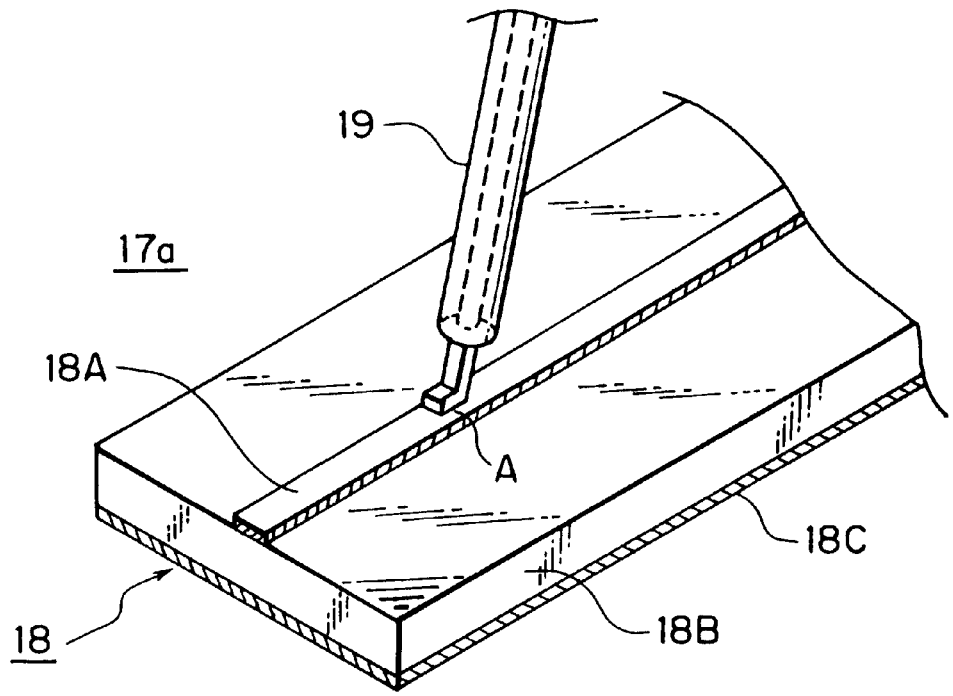
FIG. 19 is a perspective view showing schematically as enlarged a feed line employed in an antenna/mirror combination apparatus according to a tenth embodiment of the invention.

FIG. 19 is a perspective view showing schematically as enlarged the feed line 18 employed in the antenna/mirror combination apparatus according to the tenth embodiment of the invention, in which the feed line is constituted by the microstrip lines.

Referring to FIG. 19, the feed line 18 is realized in the form of a microstrip-line and includes an electrode portion 18A with which a tip end portion of the probe 19 is placed in contact under pressure, and a ground conductor layer 18C disposed in opposition to the electrode portion 18A with a dielectric layer 18B being interposed therebetween.

The probe 19 slideably abuts on the electrode portion 18A of the microstrip line and is electrically connected to the latter through the contact A.

With the arrangement described above, the electrical lengths of the feed line 18 and the probe 19 can be automatically adjusted in conformance with displacement of the probe 19 with a relatively simple structure.

Thus, there can be realized phase adjustment corresponding to the physical positional change of the antenna brought about by adjustment of the field of view of the mirror mounted on a motor vehicle or the like, whereby the change of the radiating direction 21 which would otherwise occur can easily be suppressed.

Embodiment 11

In the case of the antenna/mirror combination apparatus according to the tenth embodiment of the invention described above, the feed line 18 is constituted by the microstrip line. An eleventh embodiment of the invention is directed to an antenna/mirror combination apparatus in which the feed line 18 is constituted by a waveguide having a slot formed therein.

Figure 20:
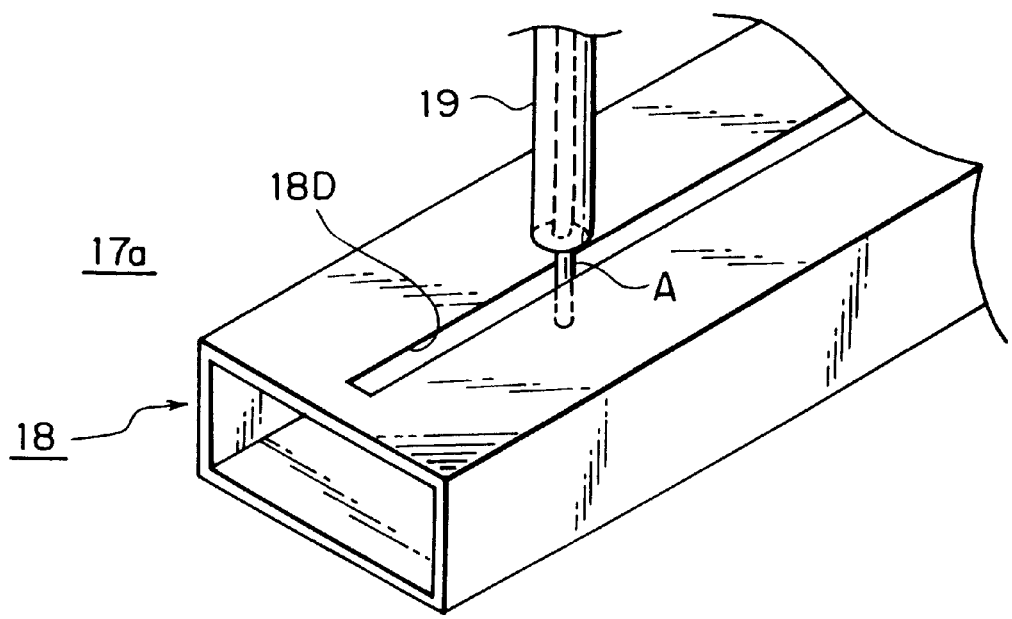
FIG. 20 is a perspective view showing schematically a feed line employed in an antenna/mirror combination apparatus according to an eleventh embodiment of the invention, in which the feed line is constituted by a waveguide.

FIG. 20 is a perspective view showing schematically a feed line 18 employed in the antenna/mirror combination apparatus according to the eleventh embodiment of the invention, in which the feed line is constituted by a waveguide.

Referring to FIG. 20, the feed line 18 is constituted by a waveguide having a slot 18D formed in the longitudinal direction.

Further, the tip end portion of the probe 19 is electromagnetically coupled to the slot 18D through the contact A and adapted to be movable along the slot 18D. It can be seen that the tip end portion of the probe 19 is inserted into the slot 18D.

In the case of the antenna/mirror combination apparatus of the structure described above, the electric connection between the slot 18D of the feed line 18 (waveguide) and the tip end portion of the probe 19 is realized through the contact A with a simple structure. Because the probe 19 is capable of moving in the direction in which the slot 18D extends, the excitation phase for the individual waveguides 12a to 12d (see FIGS. 17 and 18) can be automatically adjusted in conformance with the movement or displacement of the probe 19.

Modifications

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the slot antenna including waveguides and the microstrip antenna, it should be appreciated that other low-profile antenna such as a surface wave antenna and a leaky wave antenna can be employed. Further, in place of the microstrip antenna, other type antenna such as those deposited on a dielectric or glass substrate may be used.

Besides, the foregoing description of the antenna/mirror combination apparatus has been made on the assumption that the low-profile antenna is realized in a planar form because it is destined for use as the antenna apparatus to be integrated in a planar mirror. However, it is equally possible to realize the low-profile antenna in a curvilinear form to be integrated with a curved-surface mirror.

Accordingly, all suitable modifications and equivalents may be resorted to, falling within the spirit and scope of the invention.

What is claimed is:

1. An antenna/mirror combination apparatus, comprising:
    a mirror having an electrically conductive reflecting mirror surface; and
    a low-profile antenna having an electrically conductive antenna element including a radiating portion;
        wherein said low-profile antenna is combined integrally with said mirror; and
        wherein at least a part of said antenna element functions as a part of said reflecting mirror surface.

2. The antenna/mirror combination apparatus according to claim 1,
    wherein said antenna element which serves also as a part of said reflecting mirror surface of said mirror includes a radiating portion of said low-profile antenna.

3. The antenna/mirror combination apparatus according to claim 2,
    wherein said radiating portion is formed on a rear surface of a front glass plate of said mirror through a printing process; and
    wherein said low-profile antenna is disposed in superposition on said rear surface of said front glass plate to be integrally combined with said radiating portion.

4. The antenna/mirror combination apparatus according to claim 2,
    wherein said low-profile antenna is implemented in the form of a slot antenna array which includes:
        a slot array serving as said radiating portion; and
        a waveguide including said slot array.

5. The antenna/mirror combination apparatus according to claim 4,
    wherein said slot array is formed in a radiating surface of a waveguide of said slot antenna array; and
    wherein the front glass plate of said mirror is disposed in superposition on said radiating surface of said waveguide.

6. The antenna/mirror combination apparatus according to claim 2,
    wherein said low-profile antenna is implemented in the form of a microstrip antenna array which includes;
        a radiating element constituting said radiating portion;
        a ground conductor layer disposed in opposition to said radiating portion; and
        a dielectric layer interposed between said radiating portion and said ground conductor layer.

7. The antenna/mirror combination apparatus according to claim 6,
    wherein said radiating element is formed on a top surface of said dielectric layer.

8. The antenna/mirror combination apparatus according to claim 6,
    wherein said microstrip antenna array is formed only in a lateral region of said mirror; and
    wherein said radiating portion is constituted by a radiating element array including a plurality of radiating elements.

9. The antenna/mirror combination apparatus according to claim 6,
    wherein said dielectric layer and said ground conductor layer are disposed only at a rear side of said radiating portion.

10. The antenna/mirror combination apparatus according to claim 6,
    wherein said dielectric layer and said ground conductor layer are disposed substantially over a whole rear surface of said mirror.

11. The antenna/mirror combination apparatus according to claim 1,
    wherein said low-profile antenna is implemented in the form of a microstrip antenna which includes:
        radiating elements constituting said radiating portion;
        a ground conductor layer disposed in opposition to said radiating portion; and
        a dielectric layer interposed between said radiating portion and said ground conductor layer; and
    wherein said antenna element functioning as a part of said reflecting mirror surface of said mirror includes said ground conductor layer.

12. The antenna/mirror combination apparatus according to claim 11,
    wherein said microstrip antenna array is formed only in a lateral region of said mirror; and
    wherein said radiating elements are disposed at a front side of said reflecting mirror surface and formed in a lateral region thereof through interposition of said dielectric layer, said reflecting mirror surface being realized by said ground conductor layer in said lateral region.

13. The antenna/mirror combination apparatus according to claim 1,
    wherein said radiating portion is constituted by a plurality of radiating sub-portions and includes:
        feeder portion means for feeding electric energy to said radiating sub-portions, respectively; and
        a plurality of variable phase shifters for setting different excitation phases for said radiating sub-portions, respectively, through said feeder portion means.

14. The antenna/mirror combination apparatus according to claim 13,
   wherein the mirror having the reflecting mirror surfaces serving also as said radiating sub-portions, respectively, is implemented rotatably;
   said radiating sub-portions being juxtaposed with one another in a direction corresponding to a rotational axis of said mirror; and
   wherein said variable phase shifters are designed to set said excitation phases for said radiating sub-portions, respectively, such that physical displacements of said radiating sub-portions as brought about upon rotation of said mirror can be electrically canceled out.

15. The antenna/mirror combination apparatus according to claim 14,
   each of said variable phase shifters including:
      a feed line; and
      a probe disposed movably in opposition to said feed line,
   wherein the position of said probe relative to said feed line is displaced in conformance with an angle of rotation of said mirror to thereby set variably said excitation phase.

16. The antenna/mirror combination apparatus according to claim 15,
   wherein said feed line is constituted by a microstrip line having a ground conductor layer disposed oppositely through an interposed dielectric layer; and
   wherein said probe is brought into slidable contact with said microstrip line under pressure to be thereby electrically connected to said microstrip line.

17. The antenna/mirror combination apparatus according to claim 15,
   wherein said feed line is constituted by a waveguide having a slot formed therein; and
   wherein said probe is inserted into said slot so as to be movable along said slot.

* * * * *